United States Patent
Kubota et al.

(10) Patent No.: US 7,956,939 B2
(45) Date of Patent: Jun. 7, 2011

(54) TOUCH-PANEL-EQUIPPED DISPLAY MODULE

(75) Inventors: Hidenao Kubota, Mobara (JP); Akio Miyauchi, Mobara (JP); Yasuyuki Mishima, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 308 days.

(21) Appl. No.: 12/020,707

(22) Filed: Jan. 28, 2008

(65) Prior Publication Data

US 2008/0180585 A1    Jul. 31, 2008

(30) Foreign Application Priority Data

Jan. 26, 2007  (JP) ................................ 2007-015752

(51) Int. Cl.
*G06F 3/042* (2006.01)
*G09G 5/00* (2006.01)

(52) U.S. Cl. ......................................... 349/12; 345/173

(58) Field of Classification Search .................. 345/104, 345/172, 173, 179; 349/12, 23, 24, 58, 156, 349/162, 122, 117, 144, 173
See application file for complete search history.

(56) References Cited

U.S. PATENT DOCUMENTS

| | | | | |
|---|---|---|---|---|
| 5,831,691 A | * | 11/1998 | Kurashima et al. | 349/23 |
| 5,923,388 A | * | 7/1999 | Kurashima et al. | 349/23 |
| 6,529,188 B1 | * | 3/2003 | Suzuki | 345/173 |
| 6,628,269 B2 | * | 9/2003 | Shimizu | 345/173 |
| 6,721,019 B2 | * | 4/2004 | Kono et al. | 349/12 |
| 2001/0013861 A1 | * | 8/2001 | Shimizu | 345/173 |
| 2002/0000979 A1 | * | 1/2002 | Furuhashi et al. | 345/173 |
| 2003/0160768 A1 | * | 8/2003 | Tanabe et al. | 345/173 |
| 2005/0030294 A1 | * | 2/2005 | Ahn et al. | 345/173 |
| 2005/0099401 A1 | * | 5/2005 | Matsumoto et al. | 345/173 |
| 2006/0214925 A1 | * | 9/2006 | Taninaka et al. | 345/173 |
| 2007/0273568 A1 | * | 11/2007 | Fujii et al. | 341/144 |

FOREIGN PATENT DOCUMENTS

| | | | | |
|---|---|---|---|---|
| JP | 183671 | * | 7/2001 | ................ 349/12 |
| JP | 2006-277599 | * | 10/2006 | |

* cited by examiner

*Primary Examiner* — Akm E Ullah
(74) *Attorney, Agent, or Firm* — Antonelli, Terry, Stout & Kraus, LLP.

(57) ABSTRACT

The present invention provides a touch-panel-equipped display module which arranges a touch panel on a display panel and can maintain a favorable display obviating the adhesion of the touch panel to the display module even when the touch panel is strongly pushed. In the touch-panel-equipped display module which arranges the touch panel on the display panel, the touch panel arranges a plurality of first dot spacers on a surface thereof which faces the display panel in an opposed manner.

20 Claims, 4 Drawing Sheets

TOUCH-PANEL-EQUIPPED DISPLAY MODULE

CROSS-REFERENCE TO RELATED APPLICATION

The present application claims priority from Japanese application JP2007-015752 filed on Jan. 26, 2007, the content of which is hereby incorporated by reference into this application

BACKGROUND OF THE INVENTION

1. Field of the Invention

The present invention relates to a technique preferably applicable to a display module which arranges a touch panel on a display panel.

2. Description of the Related Art

FIG. 6 shows the cross-sectional constitution of a conventional liquid crystal display module which arranges a touch panel on a display panel.

A liquid crystal display panel is constituted by sandwiching a liquid crystal layer not shown in the drawing between a TFT substrate 11 and a color filter substrate 12 (hereinafter, referred to as a CF substrate 12). Further, the TFT substrate 11 is a substrate larger than the CF substrate 12, and a driver chip 13 for controlling driving of the liquid crystal display panel is arranged in a region of the TFT substrate 11 where the TFT substrate 11 and the CF substrate 12 do not overlap each other. Further, an upper polarizer 14 is arranged on an upper side of the CF substrate 12 and, at the same time, a lower polarizer 20 is also arranged on a lower side of the TFT substrate 11. Further, the liquid crystal display module is constituted by arranging a backlight on a lower side of the liquid crystal display panel. Here, numeral 21 indicates a sealing material for sealing liquid crystal between the TFT substrate 11 and the CF substrate 12.

The backlight is constituted of a light source 18 such as an LED arranged on a flexible printed circuit board 15 (hereinafter, referred to as an FPC 15) having one end thereof connected to terminals on the TFT substrate, for example, and a light guide plate 17 for introducing light radiated from the light source 18 to the whole liquid crystal display panel. Here, an optical sheet 22 is arranged between the light guide plate 17 and the liquid crystal display panel. The optical sheet is constituted of, for example, an upper diffusion sheet, an upper prism sheet, a lower prism sheet, a lower diffusion sheet and the like. A reflection sheet 23 is arranged on a lower side of the light guide plate 17 and plays a role of directing light led downwardly from the light guide plate 17 toward a liquid-crystal-display-panel side. The light guide plate 17 has a small thickness except for an incident surface which faces the light source 18 in an opposed manner for satisfying a demand for the reduction of thickness of a liquid crystal display device. The reason that the incident surface has a large thickness is that a size of an LED preferably used as a light source 18 is large and hence, the incident surface of the light guide plate 17 is made large in conformity with the size of the LED. In FIG. 6, numeral 16 indicates a mold frame formed in a frame shape. The liquid crystal display module is configured by arranging the liquid crystal display panel on an upper side of the frame-shaped mold frame 16 and by arranging the backlight on a lower side of the mold frame 16.

By adhering the reflection sheet 23 arranged on a lower side of the light guide plate 17 to the mold frame 16, the light guide plate 17 and the optical sheet 22 are accommodated in the inside of the mold frame 16.

Further, a touch panel 19 is arranged on the liquid crystal display module, and the touch panel 19 performs a function thereof when a user touches the touch panel 19 corresponding to positions of touch keys displayed on the liquid crystal display panel.

The patent document 1 (JP-A-2006-277599) discloses a related art relevant to the constitution of such a touch panel.

FIG. 7 is a view of a liquid crystal display module showing an essential part of the liquid crystal display module in an enlarged manner for explaining a drawback of the conventional constitution shown in FIG. 6. The touch panel 19 is constituted of a film substrate 32 having a lower side thereof covered with a resistance film not shown in the drawing and a glass substrate 31 having an upper side thereof covered with a resistance film not shown in the drawing. The touch panel 19 is configured such that a pushing position is detected when the resistance film of the film substrate 32 and the resistance film of the glass substrate 31 are brought into contact with each other due to pushing of the film substrate 32 with a finger or the like. A plurality of dot spacers 33 is arranged on the glass substrate 31 for ensuring a distance between the film substrate 32 and the glass substrate 31 and for preventing the film substrate 32 and the glass substrate 31 from being adhered to each other after pushing of the touch panel 19.

FIG. 8 shows a state of the touch panel 19 and the CF substrate 12 when the touch panel 19 is strongly pushed with a finger 81 or the like in the constitution of the conventional touch panel 19.

As shown in FIG. 8, when the touch panel 19 is strongly pushed, there exists a possibility that a lower surface of the glass substrate 31 is brought into contact with the upper polarizer 14 arranged on the CF substrate 12. Further, it is also found that once the touch panel 19 and the upper polarizer 14 on the CF substrate 12 are brought into contact with each other as shown in FIG. 8, as a next step, the touch panel 19 and the upper polarizer 14 are adhered to each other thus causing display irregularities or the like. Although the liquid crystal display module is exemplified as a display module in this specification and the liquid crystal display module is preferable as the display module, the present invention is also applicable as a display module of an organic EL panel or of other display panel.

SUMMARY OF THE INVENTION

The present invention has been made to overcome the above-mentioned drawbacks, and it is an object of the present invention to provide a touch-panel-equipped display module arranging a touch panel thereon and capable of maintaining a favorable display while preventing the adhesion of a touch panel to the display module even when the touch panel is strongly pushed.

According to a first aspect of the present invention, in a touch-panel-equipped display module arranging a touch panel on a display panel such as a liquid crystal panel or an organic EL panel, the touch panel arranges a plurality of first dot spacers on a surface thereof which faces the display panel.

According to the present invention, with the provision of the first dot spacers, even when the touch panel is strongly pushed, there is no possibility that the touch panel is adhered to the display module thus providing the touch-panel-equipped display module capable of maintaining a favorable display.

The touch panel includes a first light transmitting substrate formed of a glass substrate, for example, and a second light transmitting substrate formed of a film substrate, for example. A resistance film is arranged on surfaces of the respective light transmitting substrates which face each other in an opposed manner. The touch panel arranges a plurality of second dot spacers on the surface of the first light transmitting substrate on a side where the first light transmitting substrate faces the second light transmitting substrate in an opposed manner. The touch panel also arranges the plurality of first dot spacers on a surface of the first light transmitting substrate on a side where the first light transmitting substrate faces the display panel in an opposed manner.

Here, the plurality of first dot spacers and the plurality of second dot spacers are arranged at positions where the first dot spacers and the second dot spacers do not overlap each other as viewed from above. Due to such a constitution, the display module has an advantageous effect that glittering of the dot spacers attributed to external light reflection is hardly observed. The plurality of first dot spacers can be formed by applying an acrylic resin to the light transmitting substrate by screen printing capable of positioning the applied acrylic resin and by curing the acrylic resin using ultraviolet rays or the like.

However, the material of the first dot spacers is not limited to the acrylic resin and, provided that a resin allows light to pass therethrough and is cured by the light, such a resin can be also used as the material of the first dot spacers.

Provided that the plurality of first dot spacers has respective surfaces thereof in contact with the first light transmitting substrate formed into a circular shape, a diameter of the first dot spacer is set to a value which falls within a range from 40 µm to 60 µm, the plurality of first dot spacers is formed in a projection shape, and a height of the first dot spacer is set to a value which falls within a range from 5 µm to 15 µm, it is possible to obtain the above-mentioned advantageous effect to some extent.

Further, provided that the plurality of first dot spacers has respective surfaces thereof in contact with the first light transmitting substrate formed into a circular shape, a diameter of the first dot spacer is set to a value which falls within a range from 45 µm to 55 µm, the plurality of first dot spacers is formed in a projection shape, and a height of the first dot spacer is set to a value which falls within a range from 8 µm to 12 µm, it is optimum for the present invention. Further, to make the glittering of the first dot spacers attributed to the external light reflection hardly observable from above, it is desirable to set the diameter of the circular shape of the surface of the dot spacer in contact with the first light transmitting substrate or the height of the projection shape of the dot spacer as small as possible.

Further, in the touch-panel-equipped display module of the present invention, the plurality of first dot spacers has respective surfaces thereof in contact with the first light transmitting substrate formed into a circular shape, the plurality of second dot spacers has respective surfaces thereof in contact with the first light transmitting substrate formed into a circular shape, and the diameter of the circular shape of the first dot spacer is set smaller than the diameter of the circular shape of the second dot spacer.

Such a constitution is provided for decreasing the influence of irregular reflection attributed to projecting dots at necessary minimum corresponding to a kind of application of dot spacers. To be more specific, when the surface of the first dot spacer in contact with the light transmitting substrate is circular and has a diameter of 50 µm, the surface of the second dot spacer in contact with the light transmitting substrate is circular and has a diameter of a value which falls within a range from 30 µm to 40 µm. In this case, although both the first dot spacer and the second dot spacer have projecting cross sections respectively, heights of these dot spacers may be set substantially equal to each other although it is necessary to take peeling of the first dot spacers into consideration in designing.

From a viewpoint of preventing the concentration of glittering thus obviating discomfort in viewing with naked eyes, it is preferable to regularly arrange the plurality of first dot spacers and the plurality of second dot spacers at equal intervals in the row direction as well as in the column direction respectively, for example.

According to the present invention, it is possible to provide a touch-panel-equipped display module arranging a touch panel thereon and capable of maintaining a favorable display while preventing the adhesion of a touch panel to the display module even when the touch panel is strongly pushed.

DESCRIPTION OF THE PREFERRED EMBODIMENT

Hereinafter, a touch-panel-equipped display module of the present invention is explained in detail in conjunction with drawings.

Figure 1:
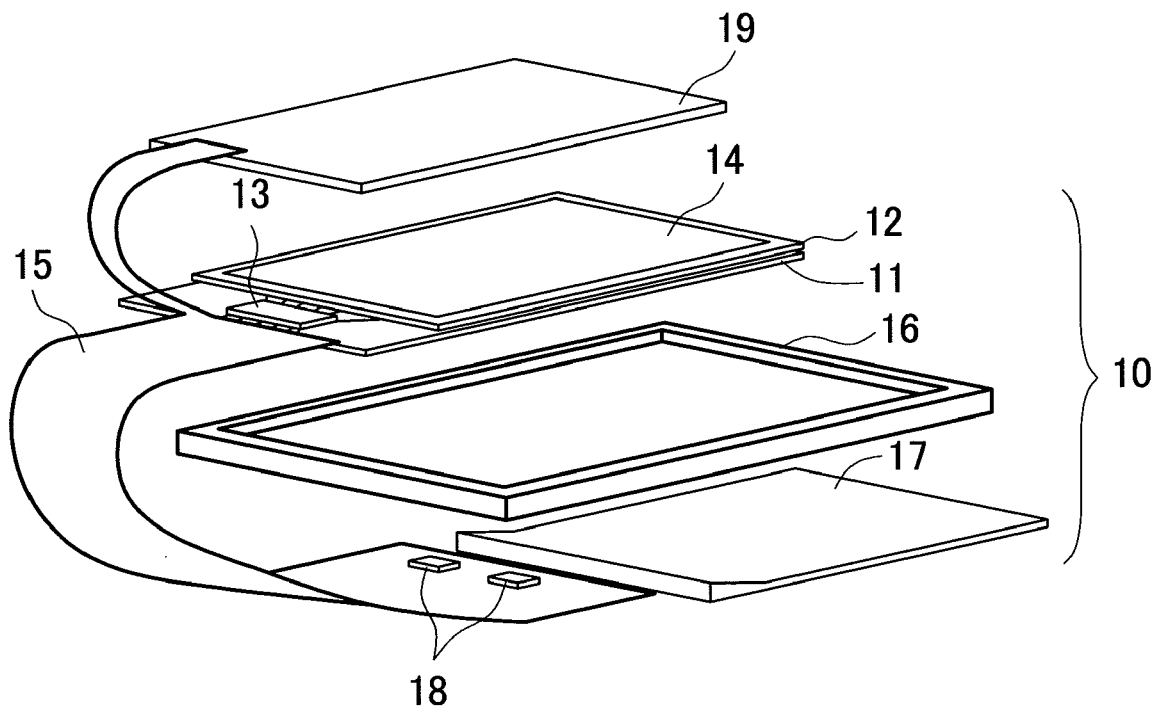
FIG. 1 is a view showing the whole constitution of a touch-panel-equipped liquid crystal display module according to the present invention.

FIG. 1 is a view showing the whole constitution of the touch-panel-equipped display module of the present invention. The touch-panel is also referred to as a touch screen.

The liquid crystal display panel is constituted by overlapping a TFT substrate 11 and a color filter 12 (hereinafter, referred to as a CF substrate 12) with a liquid crystal layer sandwiched therebetween. A driver chip 13 for controlling driving of the liquid crystal display panel is formed on a portion of the TFT substrate 11 where the TFT substrate 11 and the color filter 12 do not overlap each other. Further, one end of the flexible printed circuit board 17 is connected to the TFT substrate 11 for supplying signals to the driver chip 13.

An upper polarizer 14 is arranged on an upper side of the CF substrate 12 (on a surface side opposite to a side where the liquid crystal layer is arranged) and, further, a lower polarizer 20 not shown in FIG. 1 is arranged on a lower side of the TFT substrate 11. Further, the liquid crystal display module is constituted by arranging a backlight on a lower side of the liquid crystal display panel. Here, numeral 21 indicates a sealing material for sealing liquid crystal between the TFT substrate 11 and the CF substrate 12.

The backlight is constituted of a light source 18 such as an LED arranged on a flexible printed circuit board 15 (hereinafter, referred to as FPC 15) connected to terminals on the TFT substrate 11, a touch panel 19, for example, and a light guide plate 17 for introducing light radiated from the light source 18 to the whole liquid crystal display panel. Here, an optical sheet 22 is arranged between the light guide plate 17 and the liquid crystal display panel. The optical sheet is constituted of, for example, an upper diffusion sheet, an upper prism sheet, a lower prism sheet, a lower diffusion sheet and the like. A reflection sheet 23 is arranged on a lower side of the light guide plate 17 and plays a role of directing light led downwardly from the light guide plate 17 toward a liquid-crystal-display-panel side. The light guide plate 17 has a small thickness except for an incident surface which faces the light source 18 in an opposed manner for satisfying a demand for the reduction of thickness of a liquid crystal display device. The reason that the incident surface has a large thickness is that a size of an LED preferably used as a light source 18 is large and hence, the incident surface of the light guide plate 17 is made large in conformity with a size of the LED. Numeral 16 indicates a mold frame formed in a frame shape. The liquid crystal display module is configured by arranging the liquid crystal display panel on an upper side of the frame-shaped mold frame 16 and by arranging the backlight on a lower side of the mold frame 16. By adhering the reflection sheet 23 arranged on a lower side of the light guide plate 17 to the mold frame 16, the light guide plate 17 and the optical sheet 22 are accommodated in the inside of the mold frame 16.

Figure 2:
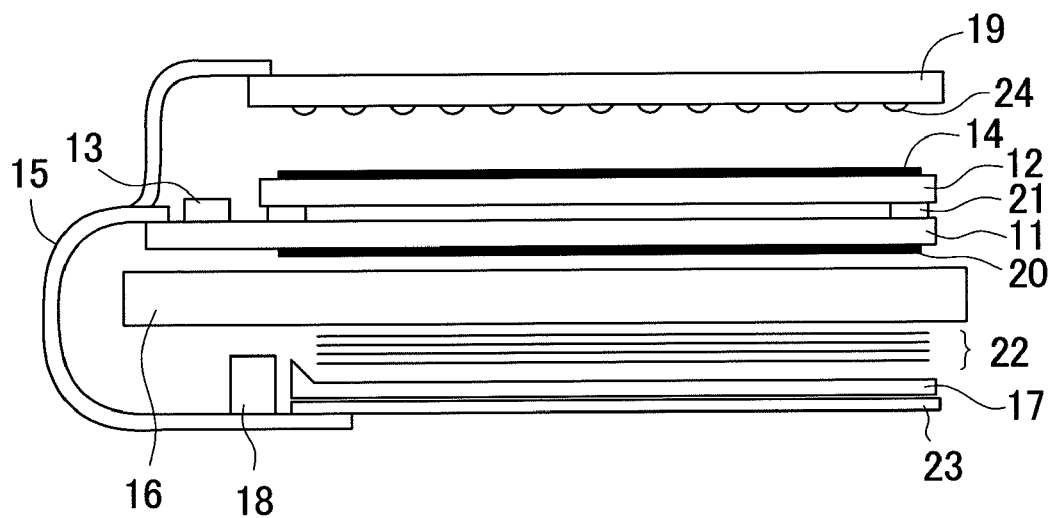
FIG. 2 is a view showing the cross-sectional constitution of the touch-panel-equipped liquid crystal display module shown in FIG. 1.

FIG. 2 is a view showing the cross-sectional constitution of the display module shown in FIG. 1.

Figure 6:
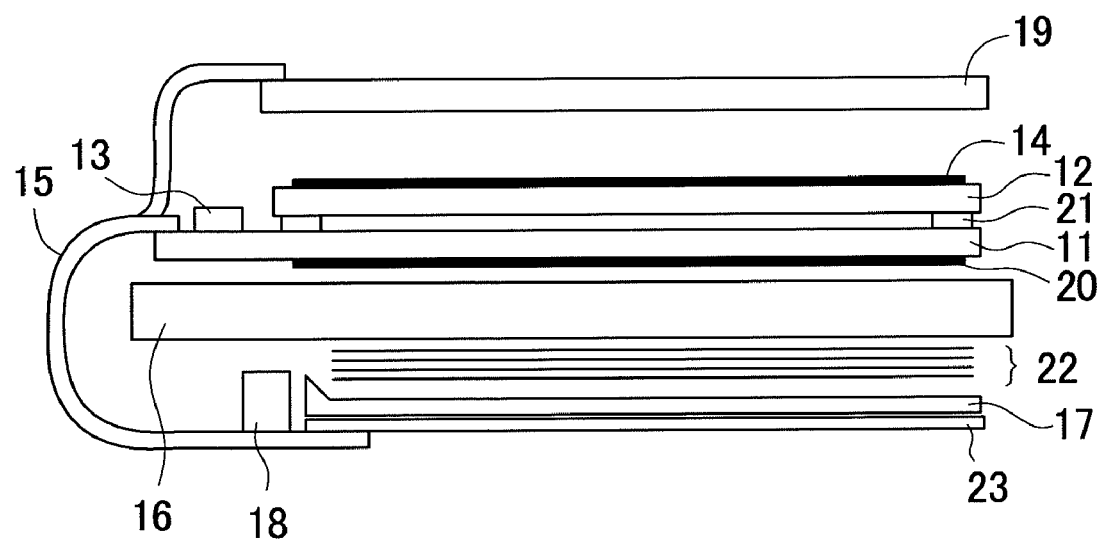
FIG. 6 is a view showing the cross-sectional constitution of a conventional liquid crystal display module which arranges a touch panel thereon.

The technical feature which makes this constitution differ from the conventional constitution shown in FIG. 6 lies in that dot spacers 24 are arranged on a lower side of a glass substrate 31 of the touch panel 19 (on a surface side facing the liquid crystal panel). Here, for discriminating the dot spacers 24 from the dot spacers arranged between the film substrate 32 and the glass substrate 31 of the conventional touch panel 19, the dot spacers 24 of the present invention are referred to as first dot spacers, and the conventional dot spacers 33 are referred to as second dot spacers.

Figure 3:
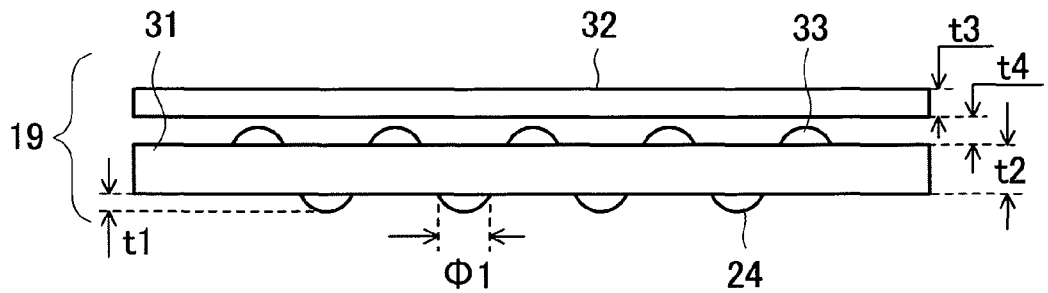
FIG. 3 is a view for explaining a portion of a touch panel of the present invention.
Figure 7:
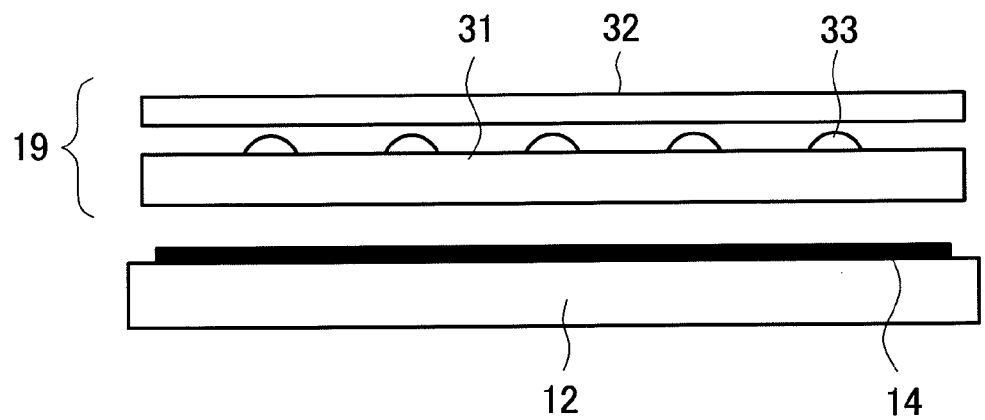
FIG. 7 is a view of the liquid crystal display module showing a portion of the liquid crystal display module in an enlarged manner for explaining a drawback of the conventional constitution shown in FIG. 6.
Figure 8:
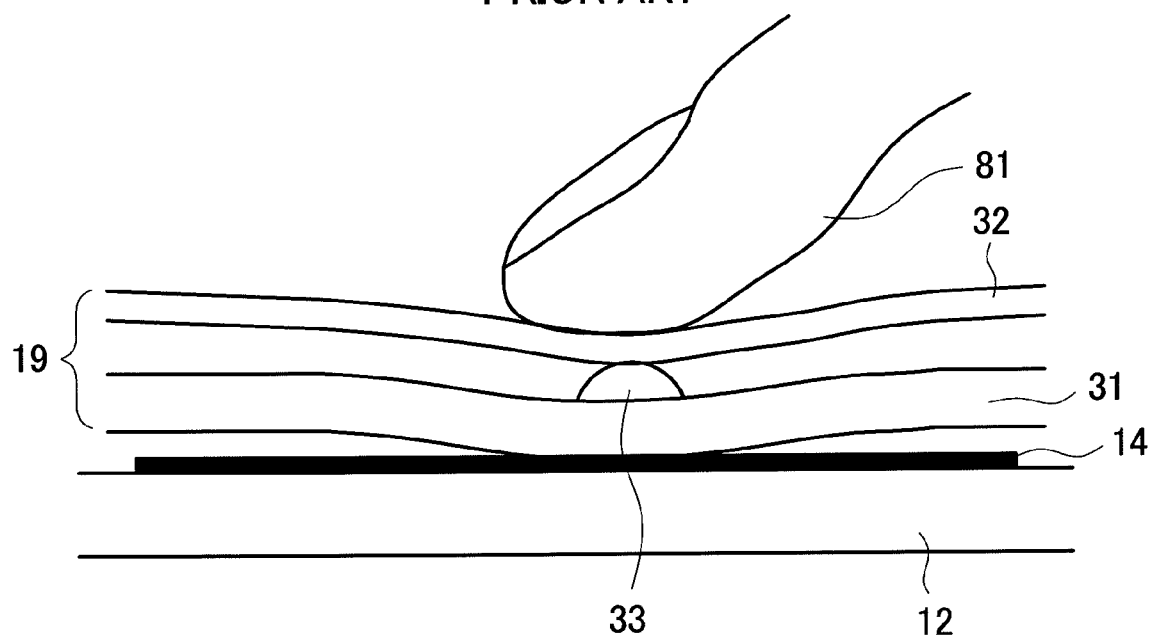
FIG. 8 is a view showing a state of the touch panel and a CF substrate when the touch panel is strongly pushed with a finger or the like in the constitution of the conventional touch panel.

FIG. 3 is a view for explaining a portion of the touch panel 19 of the present invention. The touch panel 19 is formed of the glass substrate 31 constituting a light transmitting substrate (also referred to as a first light transmitting substrate), for example, and the film substrate 32 constituting a light transmitting substrate (also referred to as a second light transmitting substrate), for example. Further, a resistance film is arranged on surfaces of the glass substrate 31 and the film substrate 32 which face each other in an opposed manner respectively. Further, the dot spacers 33 (second dot spacers) explained also in conjunction with FIG. 6 to FIG. 8 are arranged on the glass substrate 31 for preventing the adhesion of the film substrate 32 and the glass substrate 31.

In the present invention, as a countermeasure for preventing the adhesion of the touch panel 19 and the liquid crystal display panel which has not been taken into consideration in the related art, the dot spacers 24 (first dot spacers) are arranged on a lower side (on a side facing the liquid crystal display panel in an opposed manner) of the glass substrate 31.

The glass substrate 31 having a thickness t2 of a value which falls within a range from 0.55 mm to 0.7 mm is used, and the film substrate 32 having a thickness t3 of a value which falls within a range from 0.1 mm to 0.2 mm is used. Here, a distance t4 between the glass substrate 31 and the film substrate 32 is set to a value which substantially falls within a range from 0.1 mm to 0.2 mm.

Further, in the present invention, the dot spacers 24 (first dot spacers) having a projection-shape (to be more accurate, a projection shape having an arcuate shape in cross section as shown in FIG. 3) and are made of an acrylic resin are arranged on a lower side of the glass substrate 31. These dot spacers 24 have respective surfaces thereof in contact with the glass substrate 31 formed into a circular shape, wherein a diameter φ1 of the dot spacer 24 is set to 50 μm, and a height t1 of the dot spacer 24 is set to 10 μm. Here, these sizes of the dot spacer 24 are merely exemplified as the optimum values. Accordingly, for example, provided that the diameter φ1 of the dot spacer 24 falls within a range from 45 μm to 55 μm and the height t1 of the dot spacer 24 falls within a range from 8 μm to 12 μm, it is possible to provide a touch-panel-equipped liquid crystal display module which can prevent the adhesion between the touch panel 19 and the liquid crystal display panel thus preventing the generation of display irregularities in the same manner as the constitution of this embodiment where the dot spacers 24 having the diameter φ1 of 50 μm and the height t1 of 10 μm are arranged. Further, provided that sizes of the dot spacers 24 are set such that the diameter φ1 falls within a range from 40 μm to 60 μm and the height t1 falls within a range from 5 μm to 15 μm, it is possible to acquire the advantageous effects of the present invention to some extent.

Further, the dot spacer 24 (first dot spacer) may have a surface thereof in contact with a first light transmitting substrate formed in a circular shape, the dot spacer 33 (second dot spacer) may also have a surface thereof in contact with the first light transmitting substrate formed in a circular shape, and a diameter of the circular shape of the dot spacer 24 (first dot spacer) may be set smaller than a diameter of the circular shape of the dot spacer 33 (second dot spacer).

Such a constitution is provided for decreasing the influence of irregular reflection attributed to the projecting dots at necessary minimum corresponding to a kind of application of dot spacers. To be more specific, when the surface of the dot spacer 24 (first dot spacer) in contact with the light transmitting substrate is in a circular shape and has a diameter of 50 μm, the surface of the dot spacer 33 (second dot spacer) in contact with the light transmitting substrate is in a circular shape and has a diameter of a value which falls within a range from 30 μm to 40 μm. In this case, although both the dot spacer 24 (first dot spacer) and the dot spacer 33 (second dot spacer) have projecting cross sections, heights of these dot spacers may be set substantially equal to each other although it is necessary to take peeling of the dot spacers 24 (first dot spacers) into consideration in designing.

Figure 4:
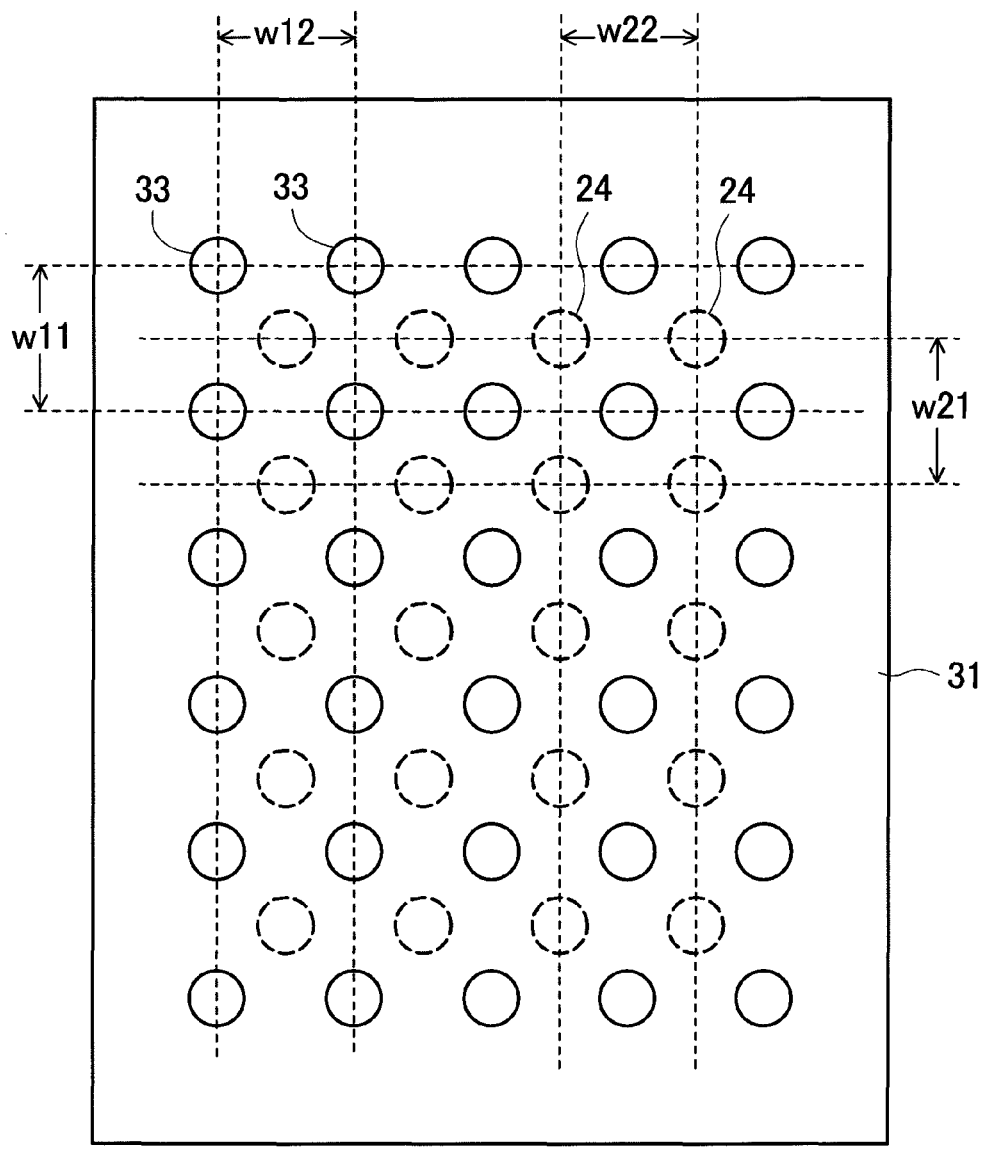
FIG. 4 is a view showing the relationship between the arrangement of dot spacers arranged on an upper surface of a glass substrate and the arrangement of dot spacers arranged on a lower surface of the glass substrate.

FIG. 4 shows the relationship between the arrangement of the dot spacers 33 (second dot spacers) arranged on an upper surface of the glass substrate 31 (a surface facing the film substrate 31 in an opposed manner) and the arrangement of the dot spacers 24 (first dot spacers) arranged on a lower surface of the glass substrate 31 (a surface facing the liquid crystal panel in an opposed manner).

Also in a conventional touch panel, the dot spacers 33 are arranged on the upper substrate of the glass substrate 31. The dot spacers 33 are, as shown in FIG. 4, arranged at equal intervals (w11=2 mm), for example, in the longitudinal direction and, as the same time, arranged at equal intervals (w12=2 mm) in the lateral direction.

The present invention is also characterized by the constitutional feature that the dot spacers 24 (first dot spacers)

arranged on the lower surface of the glass substrate 31 are arranged at portions of the glass substrate 31 where the dot spacers 24 (first dot spacers) do not overlap the dot spacers 33 (second dot spacers). This is because that when the dot spacers 33 and the dot spacers 24 are arranged at positions where the dot spacers 33, 24 overlap each other, the external light reflection at positions where the dot spacers 33, 24 overlap each other generates strong glittering attributed to a lens effect. Further, it is preferable to arrange the dot spacers 24 of the present invention, as shown in FIG. 4, at intermediate points between positions where the dot spacers 33 are arranged. By arranging the dot spacers 24 in such a manner, it is possible to suppress glittering intrinsic to the dot spacers 33 and the dot spacers 24. The dot spacers 24 arranged in this manner may be arranged, in the same manner as the dot spacers 33, at equal intervals (w21=2 mm), for example, in the longitudinal direction and, at the same time, are arranged at equal intervals (w22=2 mm), for example, in the lateral direction.

As described above, from a viewpoint of preventing the concentration of glittering thus obviating discomfort in viewing with naked eyes, it is preferable to regularly arrange the dot spacers 24 (first dot spacers) and the dot spacers 33 (second dot spacers) at equal intervals in the row direction as well as in the column direction respectively, for example.

Figure 5:
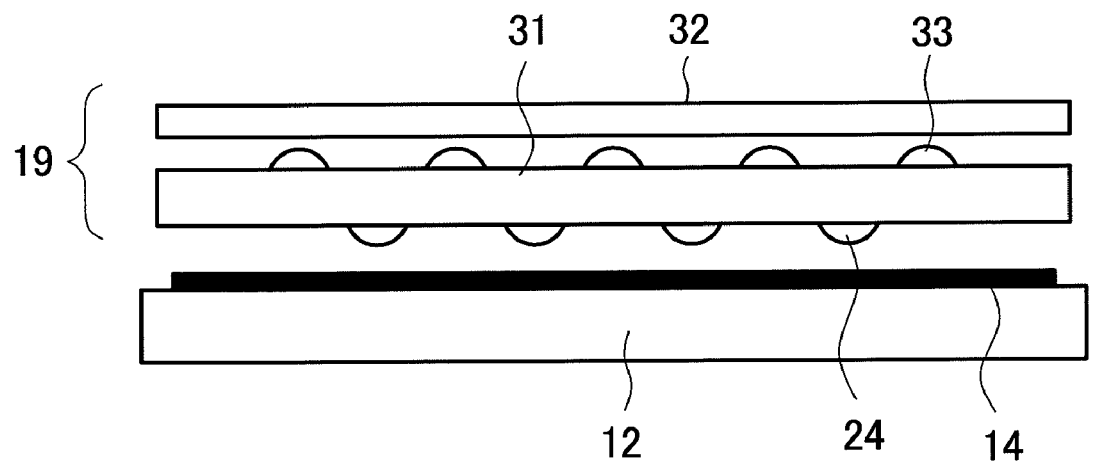
FIG. 5 is an explanatory view of a portion of the liquid crystal display module formed by arranging a touch panel shown in FIG. 4 on the liquid crystal display panel.

FIG. 5 is an explanatory view of a portion of a display module constituted by arranging the touch panel 19 shown in FIG. 4 on a liquid crystal panel.

In the constitution shown in FIG. 5, when the touch panel 19 is strongly pushed, the dot spacer 24 of the touch panel 19 is brought into contact with the upper polarizer 14 on the CF substrate 12. Then, when a pushing force of the touch panel 19 is removed, due to a repulsive force of the dot spacer 24 arranged on the touch panel 19, the touch panel 19 is quickly separated from the upper polarizer 14. As a result, there is no possibility that the touch panel is adhered to the display module thus providing a touch-panel-equipped display module which can maintain a favorable display.

As described heretofore, in this specification, although the explanation has been made by taking the liquid crystal display module using the liquid crystal panel as the display module as the example, the present invention is also applicable to a display module using an organic EL panel.

What is claimed is:

1. A touch-panel-equipped display module arranging a touch panel on a display panel thereof, wherein
   the touch panel arranges a plurality of first dot spacers on a surface thereof which faces the display panel in an opposed manner,
   the plurality of first dot spacers are arranged at equal intervals from one another along first and second orthogonal directions of the touch panel,
   the touch panel arranges a plurality of second dot spacers on a surface thereof which does not face the display panel,
   the first dot spacers and the second dot spacers have a circular shape, and
   a diameter of the circular shape of the first dot spacer is set smaller than a diameter of the circular shape of the second dot spacer.

2. A touch-panel-equipped display module according to claim 1, wherein the touch panel includes a first light transmitting substrate and a second light transmitting substrate, and arranges a resistance film on surfaces of the respective light transmitting substrates which face each other in an opposed manner,
   the touch panel arranges a plurality of second dot spacers on the surface of the first light transmitting substrate on the side where the first light transmitting substrate faces the second light transmitting substrate in an opposed manner, and
   the touch panel arranges the plurality of first dot spacers on a surface of the first light transmitting substrate on a side where the first light transmitting substrate faces the display panel in an opposed manner.

3. A touch-panel-equipped display module according to claim 2, wherein the plurality of first dot spacers and the plurality of second dot spacers are arranged at positions where the first dot spacers and the second dot spacers do not overlap each other as viewed from above.

4. A touch-panel-equipped display module according to claim 2, wherein the plurality of first dot spacers is made of an acrylic resin.

5. A touch-panel-equipped display module according to claim 2, wherein the plurality of first dot spacers has respective surfaces thereof in contact with the first light transmitting substrate formed into the circular shape, and the diameter of the first dot spacer is set to a value which falls within a range from 40 μm to 60 μm.

6. A touch-panel-equipped display module according to claim 5, wherein the plurality of first dot spacers is formed in a projection shape, and a height of the first dot spacer is set to a value which falls within a range from 5 μm to 15 μm.

7. A touch-panel-equipped display module according to claim 2, wherein the plurality of first dot spacers has respective surfaces thereof in contact with the first light transmitting substrate formed into the circular shape, and the diameter of the first dot spacer is set to a value which falls within a range from 45 μm to 55 μm.

8. A touch-panel-equipped display module according to claim 7, wherein the plurality of first dot spacers is formed in a projection shape, and a height of the first dot spacer is set to a value which falls within a range from 8 μm to 12 μm.

9. A touch-panel-equipped display module according to claim 2, wherein the display panel is formed of a liquid crystal display panel.

10. A touch-panel-equipped display module according to claim 2, wherein the display panel is formed of an organic EL panel.

11. A touch-panel-equipped display module according to claim 2, wherein the plurality of first dot spacers has respective surfaces thereof in contact with the first light transmitting substrate,
   the plurality of second dot spacers has respective surfaces thereof in contact with the first light transmitting substrate, and a diameter of the circular shape of the first dot spacer is set smaller than a diameter of the circular shape of the second dot spacer
   a diameter of the circular shape of the first dot spacer is set smaller than a diameter of the circular shape of the second dot spacer.

12. A touch-panel-equipped display module according to claim 11, wherein the plurality of first dot spacers and the plurality of second dot spacers are regularly arranged as viewed from above.

13. A touch-panel-equipped display module according to claim 1, wherein the surface of the touch panel having the plurality of first dot spacers arranged thereon and which faces a surface of the display panel in the opposed manner is arranged so as to enable contact of the surface of the display panel with the surface of the display panel when the touch panel is pushed toward the display panel, the plurality of first dot spacers being arranged on the surface of the touch panel so as to substantially prevent adherence of the surface of the touch panel to the surface of the display panel even when the touch panel is strongly pushed toward the display panel.

14. A touch-panel-equipped display module comprising a touch panel and a display panel, the touch panel being disposed in opposition to the display panel so that a first surface of the touch panel and a first surface of the display panel are arranged in opposition and facing one another, the first surface of the touch panel which faces the first surface of the display panel being arranged so as to enable contact with the first surface of the display panel when the touch panel is pushed toward the display panel, and the first surface of the touch panel having a plurality of first dot spacers arranged thereon so as to substantially prevent adherence of the first surface of the touch panel to the first surface of the display panel even when the touch panel is strongly pushed toward the display panel, the plurality of first dot spacers are arranged at equal intervals from one another along first and second orthogonal directions of the touch panel, the touch panel arranges a plurality of second dot spacers on another surfaces thereof which does not face the display panel, the first dot spacers and the second dot spacers have a circular shape, and a diameter of the circular shape of the first dot spacer is set smaller than a diameter of the circular shape of the second dot spacer.

15. A touch-panel-equipped display module according to claim 14, wherein the touch panel includes a first light transmitting substrate and a second light transmitting substrate, the first light transmitting substrate having the first surface which faces the first surface of the display panel and having the plurality of first dot spacers arranged thereon, the first light transmitting substrate having the another surface which is a second surface which faces and is opposed to a first surface of the second light transmitting substrate, and a plurality of second dot spacers being arranged on the second surface of the first light transmitting substrate which faces and is opposed to the first surface of the second light transmitting substrate.

16. A touch-panel-equipped display module according to claim 15, wherein the plurality of the first dot spacers on the first surface of the first light transmitting substrate and the plurality of second dot spacers arranged on the second surface of the first light transmitting substrate are arranged at positions which do not overlap each other as viewed from above.

17. A touch-panel-equipped display module according to claim 2, wherein the plurality of second dot spacers are arranged at equal intervals from one another along the first and second orthogonal direction of the touch panel.

18. A touch-panel-equipped display module according to claim 3, wherein the plurality of second dot spacers are arranged at equal intervals from one another along the first and second orthogonal direction of the touch panel, and the equal intervals of the plurality of first dot spacers are equal to the equal intervals of the plurality of second dot spacers.

19. A touch-panel-equipped display module according to claim 15, wherein the plurality of second dot spacers are arranged at equal intervals from one another along the first and second orthogonal direction of the touch panel.

20. A touch-panel-equipped display module according to claim 16, wherein the plurality of second dot spacers are arranged at equal intervals from one another along the first and second orthogonal direction of the touch panel, and the equal intervals of the plurality of first dot spacers are equal to the equal intervals of the plurality of second dot spacers.

* * * * *